United States Patent
Braun et al.

[19]

[11] Patent Number: 5,997,004
[45] Date of Patent: Dec. 7, 1999

[54] HYBRID FLOATING BRUSH SEAL

[75] Inventors: Minel J. Braun, Akron; Fred K. Choy, Copley, both of Ohio

[73] Assignee: Flowserve Management Company, Irving, Tex.

[21] Appl. No.: 08/735,328

[22] Filed: Oct. 22, 1996

[51] Int. Cl.⁶ .............................. F16J 15/34; F16J 15/447
[52] U.S. Cl. ..................... 277/352; 277/355; 277/362; 277/400
[58] Field of Search .................. 277/352, 355, 277/362, 390, 400

[56] References Cited

U.S. PATENT DOCUMENTS

| | | | |
|---|---|---|---|
| 2,365,046 | 12/1944 | Bottomley | 277/85 |
| 2,498,739 | 2/1950 | Magnesen | 277/352 |
| 2,871,041 | 1/1959 | Anderton | 277/362 |
| 3,529,839 | 9/1970 | Greiner et al. | |
| 3,655,206 | 4/1972 | Adams | 277/93 R |
| 4,265,455 | 5/1981 | Lundgren | 277/53 |
| 4,403,779 | 9/1983 | Wilkinson | 277/53 |
| 4,486,026 | 12/1984 | Furumura et al. | |
| 4,696,480 | 9/1987 | Jornhagen | 277/53 |
| 5,026,252 | 6/1991 | Hoffelner | 277/53 |
| 5,106,104 | 4/1992 | Atkinson et al. | 277/53 |
| 5,135,237 | 8/1992 | Flower | 277/53 |
| 5,143,384 | 9/1992 | Lipschitz | 277/96.1 |
| 5,318,309 | 6/1994 | Tseng et al. | 277/355 |
| 5,474,305 | 12/1995 | Flower | 277/355 |
| 5,496,045 | 3/1996 | Millener et al. | 277/355 |

FOREIGN PATENT DOCUMENTS

| | | | |
|---|---|---|---|
| 651161 | 3/1979 | U.S.S.R. | 277/53 |
| 86/05252 | 9/1986 | WIPO | 277/53 |

*Primary Examiner*—Anthony Knight
*Assistant Examiner*—John L. Beres
*Attorney, Agent, or Firm*—Flynn, Thiel Boutell & Tanis, P.C.

[57] ABSTRACT

A hybrid floating brush seal (10) generally includes a brush (30) that encircles a rotating shaft (12). The brush (30) includes a bristle portion (32) that is carried by a holder (34). A self acting film device such as a spiral groove seal (52) is disposed adjacent to a back plate (36) of the holder (34). A collar (72) is disposed adjacent to a front plate (38) of the holder (34). A plurality of pins (70) and springs (76) act to bias the brush (30) away from the collar (72) towards the spiral groove seal (52). When the shaft (12) rotates, the spiral groove seal (52) creates a cushion of air between itself and the back plate (36) of the brush (30) thus forcing the brush (30) against the springs (76). Thus, the brush (30) constantly adjusts its position between the collar (72) and the spiral groove seal (52) while creating minimal friction. A primary seal is formed by the engagement of the bristle portion (32) with the shaft (12) while a secondary seal is formed between the back plate (36) and the spiral groove seal (52).

28 Claims, 6 Drawing Sheets

HYBRID FLOATING BRUSH SEAL

RELATED PATENT APPLICATIONS

None.

FIELD OF THE INVENTION

The present invention generally relates to fluid seals for rotating shafts. More particularly, the present invention relates to a floating hybrid brush seal for use between a rotating shaft and a nonrotating support body. Specifically, the present invention relates to the combination of a brush seal with an axial load-supporting device to produce a low-friction hybrid floating brush seal that may be used in conjunction with a rotating shaft and a nonrotating support body to separate an area of high pressure from an area of low pressure.

BACKGROUND OF THE INVENTION

Apparatus such as aircraft engines, turbines, and pumps typically include at least one shaft that normally rotates at a relatively high speed. An apparatus such as an aircraft jet engine may include multiple shafts that normally operate at high speeds while passing through several zones of varying pressures. A jet engine creates thrust by compressing atmospheric air, mixing fuel with the compressed air and igniting it, and passing the ignited and expanded air/fuel mixture through a turbine. Zones having various pressures exist throughout the length of the engine. These zones must be sealed from one another in order to generally allow the engine to operate and in particular to increase the efficency of the aircraft engie. In addition to the high rotational speeds of an aircraft engine shaft, axial and radial shaft movement increases the difficulties associated with manitaining effective seals throughout the lifetime of the engine. An effective seal must be able to continuously accommodate both axial and radial shaft movement while maintaining the seal. When rigid seals are installed, shaft movement eventually creates excessive wear leading to an ineffective seal.

One type of seal that has been increasingly used in recent years in order to accommodate the shaft movement mentioned above is a brush seal. Numerous configurations of brush seals for use with shafts are known in the art. Each brush seal generally includes a ring-shaped body member having bristles extending therefrom. The bristles may extend radially inward or radially outward from the body portion. In a typical configuration, the bristles contact the rotating member while the body member is fixed to a stationary support member. The bristles are flexible enough to allow the shaft to rotate against it, and to move both axially and radially, while effectively maintaining a seal. The bristles may be constructed from a variety of materials. One common construction is the use of a plurality of metal or ceramic bristles that are held by the holding body member at one end and are free and contacting the moving shaft at the other end. Another construction includes a series of interlocking fingers.

In the past, brush seals have been used unsuccessfilly in apparatus such as aircraft engines, turbines, and pumps because of the high shaft speeds required by these devices. The high shaft speeds often cause the bristle portion contacting the shaft to rapidly deteriorate due to the amount of heat that is quickly generated at the shaft/brush interface and the shaft eccentricity. When the bristle portions are constructed from a stronger material (e.g., ceramics), the section of the shaft contacting the bristle portion undesirably wears causing the entire shaft to require replacement or rehabilitation. The frictional engagement of the brush with the rotating member also creates the undesirable generation of heat.

SUMMARY OF THE INVENTION

It, accordingly, becomes the principal object of this invention to provide a hybrid floating brush seal that may be used with a high speed shaft, and removes in part or totality the shortcomings of the brush seal known in the prior art.

It is another object of the present invention to provide a hybrid floating brush seal, as above, that accommodates axial and radial shaft movement.

It is a further object of the present invention to provide a hybrid floating brush seal, as above, that forms a primary seal and a secondary seal between a rotating shaft and a nonrotating body member.

It is still another object of the present invention to provide a hybrid floating brush seal that includes a brush operating in cooperation with an axial load-supporting device to seal a high pressure area from a low pressure area along a rotating shaft.

It is another object of the present invention to provide a hybrid floating brush seal that may be incorporated into existing apparatus designs without requiring operational modification of those apparatus.

It is another object of the present invention to provide a hybrid floating brush seat that includes one or more self acting film devices that maintain a seal while substantially eliminating friction between the rotating member and the nonrotating member.

In general, a hybrid floating brush seal for sealing an area of high pressure from an area of low pressure in conjunction with a rotating shaft carried by a nonrotating body, the seal induding at least one brush encircling the shaft; the brush forming a first seal between the area of high pressure and said area of low pressure; an axial load-supporting device encircling the shaft; the axial load-supporting device forming a second seal between the area of high pressure and the area of low pressure.

These and other objects of the invention, as well as the advantages thereof over existing and prior art forms, which will be apparent in view of the following detailed description, are accomplished by means hereinafter described and claimed and illustrated in the accompanying drawings.

DESCRIPTION OF THE PREFERRED EMBODIMENTS

Figure 1:
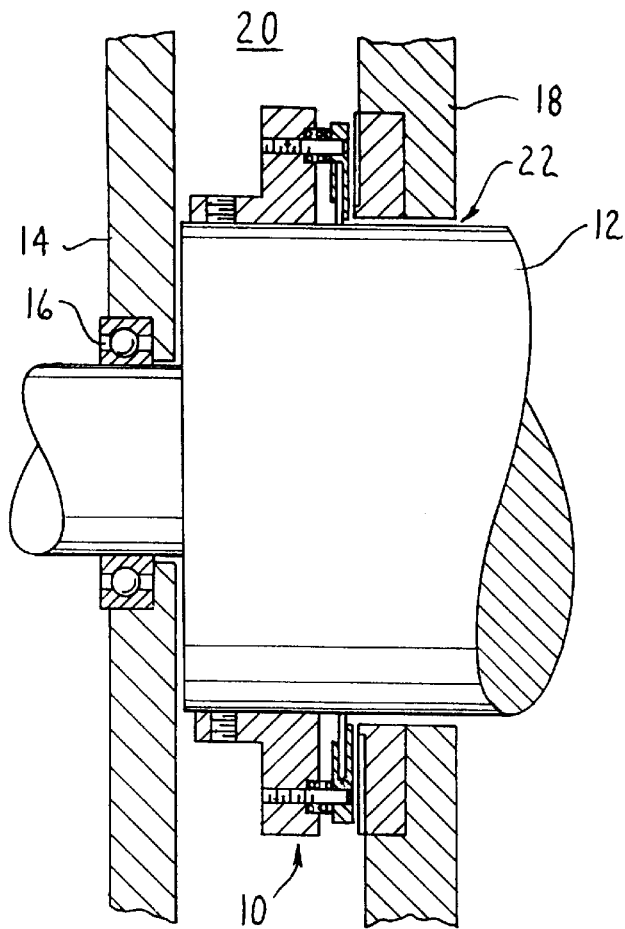
FIG. 1 is a sectional side view of the primary embodiment of a hybrid floating brush seal encircling a shaft.

The primary embodiment of a hybrid floating brush seal of the present invention is depicted in FIG. 1 and is indicated generally by the numeral 10. The seal 10 encircles a shaft 12 that is rotatably supported in a nonrotating front panel 14 by a bearing 16. The shaft 12 also passes through a nonrotating back panel 18. An area of high pressure, indicated by the numeral 20, exists in front of and around the seal 10 while an area of low pressure, indicated by the numeral 22, exists behind the seal 10. Thus, the seal 10 functions to substantially prevent fluid passage from the area of high pressure 20 to the area of low pressure 22. As will be subsequently described, the seal 10 accomplishes this by forming a primary seal and a secondary seal between the high pressure area 20 and the low pressure area 22.

The primary embodiment of the hybrid floating brush seal 10 includes a brush 30 that frictionally engages the shaft 12 such that there is no relative motion between the brush 30 and the shaft 12. As may be seen in FIG. 2, the brush 30 includes a bristle portion 32 that is carried by a holder 34. The bristle portion 32 may be any one of the variety of bristle portions that are known in the art. In the primary embodiment of the present invention, the bristle portion 32 includes a plurality of bristles. In other embodiments of the present invention, the bristle portion may be fabricated from a series of overlapping fingers. The holder 34 includes a back plate 36 and a front plate 38 connected by a weld 40.

Figure 3:
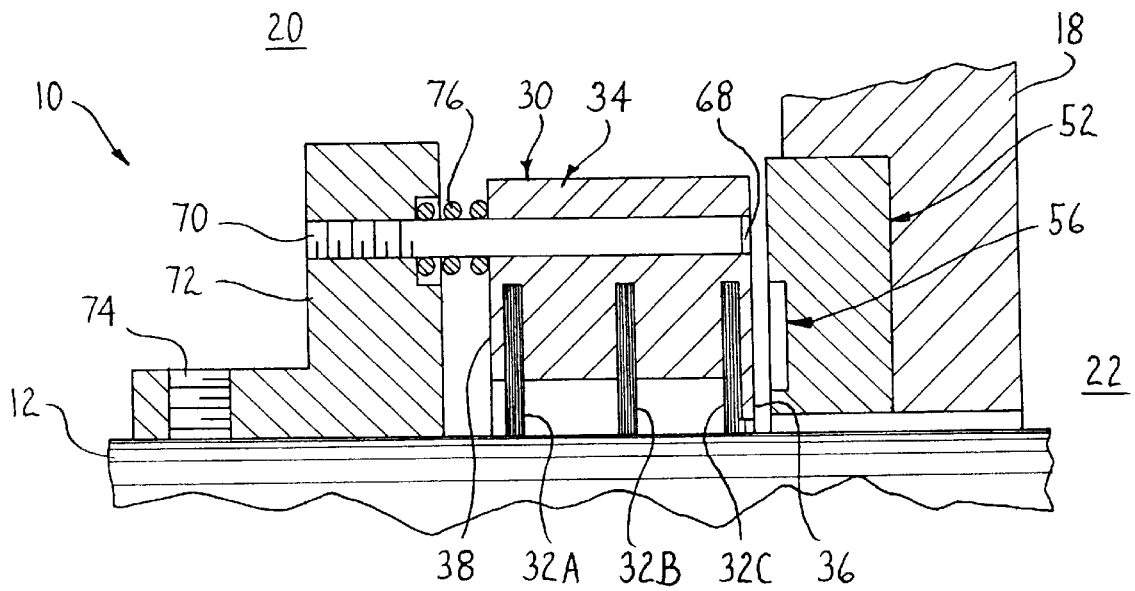
FIG. 3 is a sectional view of an alternative multi-brush configuration for the primary embodiment of the hybrid floating brush seal.

The brush 30 may also include multiple bristle portions 32 as shown in FIG. 3. In the brush 30 shown in FIG. 3, the holder 34 supports a plurality of bristle portions 32A, 32B, and 32C. Each bristle portion 32 may be identical or each may be fabricated from different materials depending on the desired level of sealing. While brushes 30 having multiple bristle portions function the same as brushes 30 having a single bristle portion 32 for the purposes of the present invention, their effect is additive.

Figure 10:
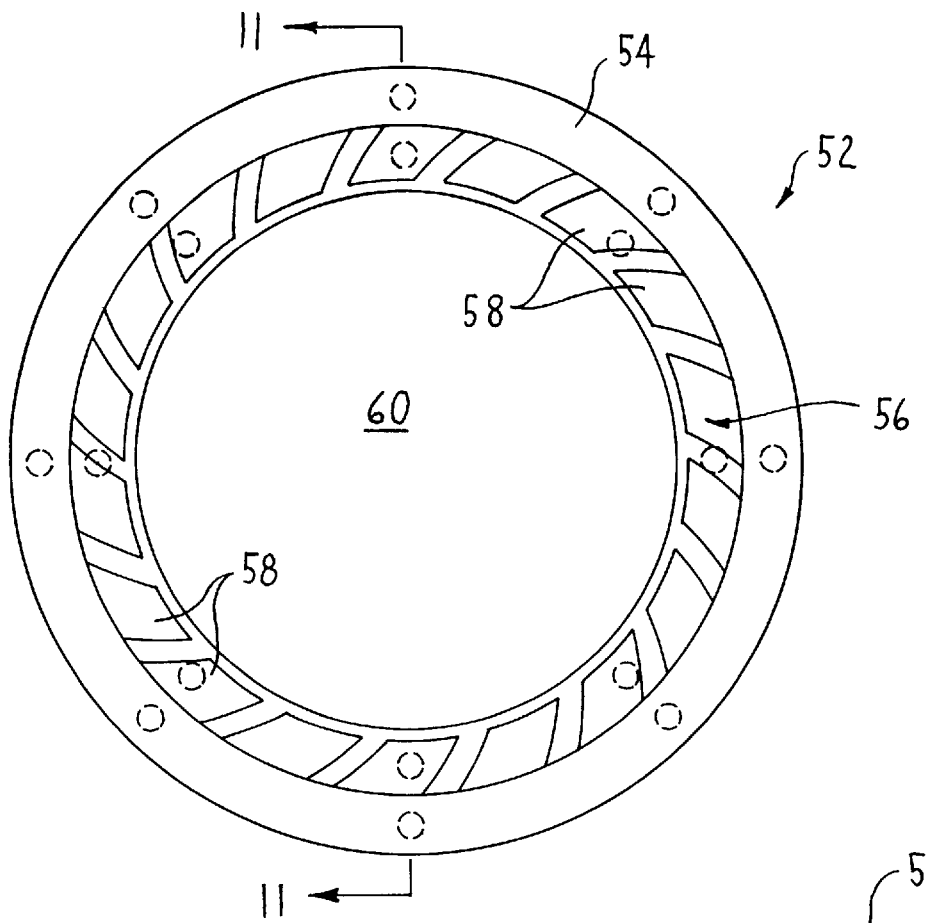
FIG. 10 is a front view of the spiral groove seal.
Figure 11:
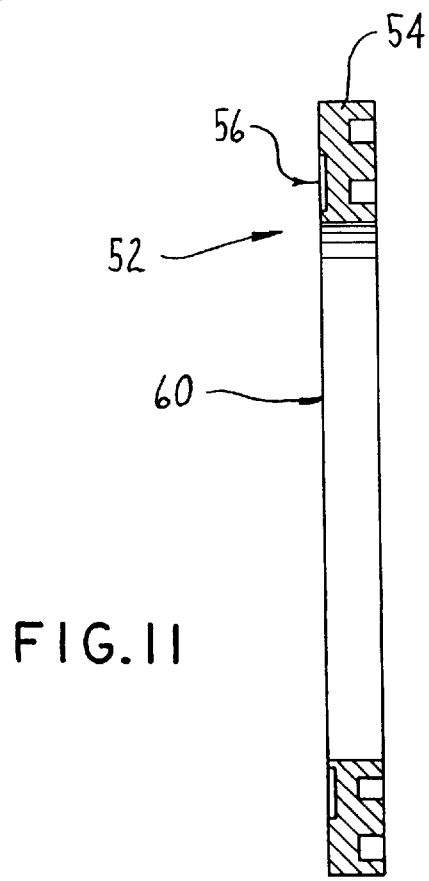
FIG. 11 is a sectional side view of the spiral groove seal depicted in FIG. 10.

An axial load-supporting device 50 is positioned adjacent to the back plate 36 of the holder 34. For the purposes of this specification, an axial load-supporting device 50 is a device that creates a cushion of air between itself and an element to be supported. In the primary embodiment, the element to be supported is the brush 30. Numerous types of axial load-supporting devices 50 are known in the art One type of an axial load-supporting device 50 is a self acting film device that creates a cushion of air in response to relative motion between itself and the element to be supported. An example of a self acting film device that may be used in the present invention is depicted in FIGS. 10 and 11 and is known as a spiral groove seal 52.

A spiral groove seal 52 includes a body 54 on which a groove section 56 is etched. The groove section 56 includes a plurality of spaced grooves 58. The configuration creates a cushion of air when a flat surface is moved circumferentially against the groove section 56. In the spiral groove seal 52 used with the present invention, the spiral groove seal 52 has an opening 60 configured to accept the shaft 12.

Figure 5:
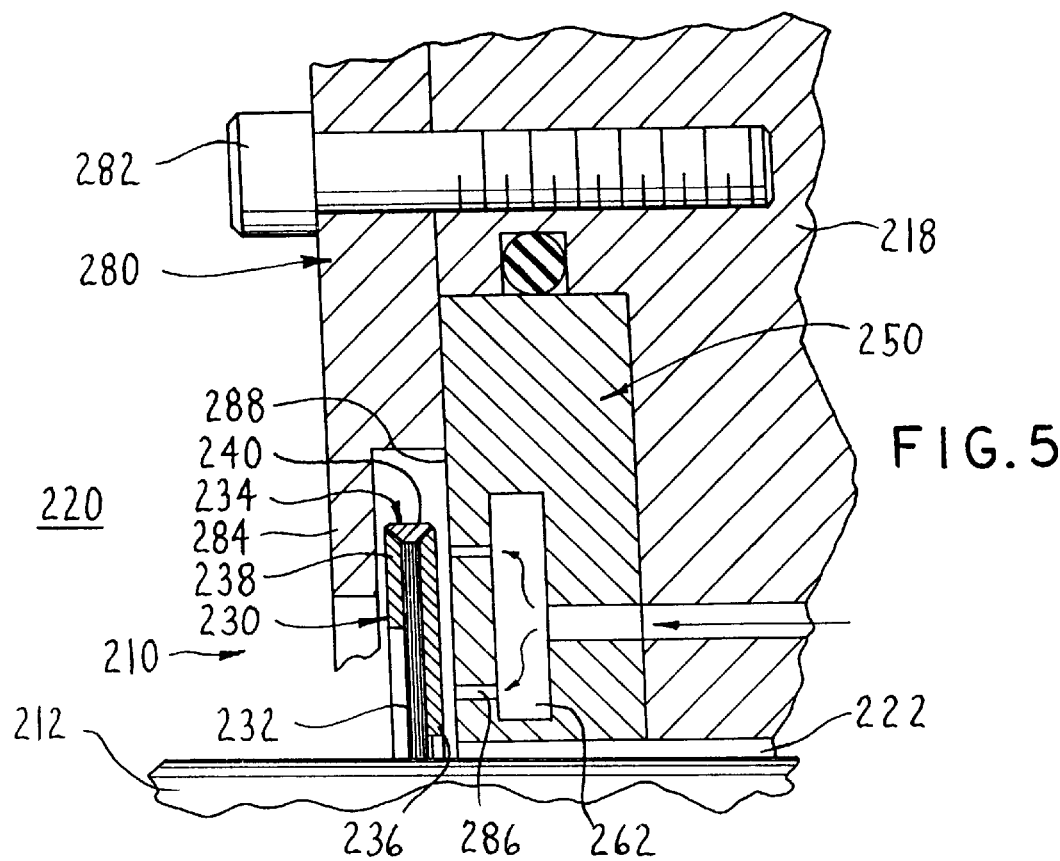
FIG. 5 is a sectional view of a hybrid floating brush seal according to the second alternative embodiment of the present invention.

Another type of axial load-supporting device 50 is depicted in FIG. 5 and is known as a hydrostatic thrs seal 262. A hydrostatic thrust seal 262 operates by directing a stream of compressed air against the element to be supported such that a cushion of air forms between the two. For instance, in FIG. 5, the element to be supported is the brush 230. Thus, a hydrostatic thrust seal 262 requires a source of compressed air to operate while the self acting film device operates in response to relative movement. Furthermore, various types of these devices are known in the art and may be incorporated into the present hybrid floating brush seal 10 without departing from the scope of the invention.

Figure 2:
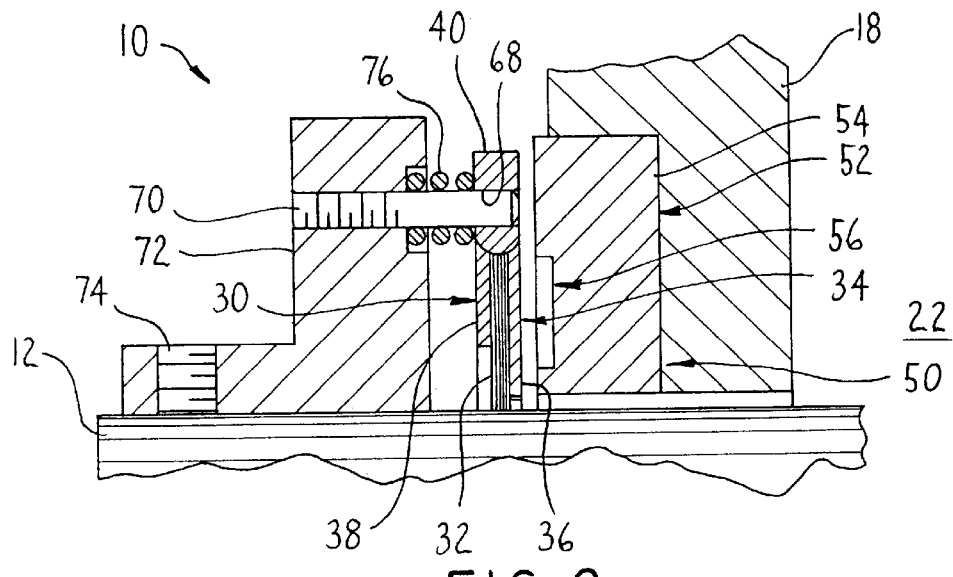
FIG. 2 is a sectional view of the hybrid floating brush seal depicted in FIG. 1.

With continued reference to FIG. 2, the axial load-supporting device 50 includes a spiral groove seal 52 having a body 54 that is nonrotatably carried by the back panel 18. The spiral groove seal 52 is disposed such that the groove section 56 is adjacent to the back plate 36. Both elements 36 and 56 have machined smooth surfaces that allow the two elements 36 and 56 to rotate against each other with minimal fiction for a microsecond and to rotate without friction at very close distances thereafter.

The end plate or weld 40 of the holder 34 has a plurality of holes 68 passing therethrough, each configured to slidingly accept a pin 70 that extends from a collar 72. The collar 72 is attached to the shaft 12 by any suitable connector such as a set screw 74 whereby the collar 72 rotates with the shaft 12. A spring 76 surrounds each pin 70 and is positioned between the collar 72 and the holder 34. Each spring 76 is depicted as a coil spring but may be one of any type of biasing device known in the art. The springs 76 urge the brush 30 toward the axial load-supporting device 50 such that the back plate 36 contacts the spiral groove seal 52 when the shaft 12 is not rotating.

The primary embodiment of the hybrid floating brush seal 10 operates in the following manner. While the shaft 12 is at rest, the back plate 36 is forced into contact with the spiral groove seal 52 by the springs 76. Thus, at start up, when the shaft 12 is slowly rotating, a seal is maintained between the spiral groove seal 52 and the back plate 36 by the force of the springs 76. The use of the springs 76 provides an added degree of sealing at low shaft speeds but may increase the amount of friction in the seal 10.

The brush 30 begins to rotate with the shaft 12 because of the frictional forces between the bristle portion 32 and the shaft 12. The pins 70 prevent the brush 30 from slipping on the shaft 12. The interface between the bristle portion 32 and the shaft 12 forms a primary seal between the high pressure area 20 and the low pressure area 22. The effectiveness of the primary seal may be adjusted by altering the materials and configuration of the bristle portion 32. The problems of high friction between the brush 30 and the shaft 12 are eliminated because the brush 30 rotates with the shaft 12 in the present to invention.

As the speed of the shaft 12 increases, a film of air is created between the spiral groove seal 52 and the back plate 36. The film of air forces the brush 30 away from the spiral groove seal 52 in the direction of the collar 72. As the brush 30 moves, a small amount of leakage occurs between the high pressure area 20 and the low pressure area 22 through the gap between the back plate 36 and the groove section 56. The amount of leakage, however, is insignificant compared to the overall sealing effect of the seal 10. The amount of leakage is limited by the action of the springs 76 which force the brush 30 back along the pins 70 toward the spiral groove seal 52. Thus, in operation, the brush 30 automatically adjusts its position between the springs 76 and the spiral groove seal 52 and forms a very low leakage secondary seal.

While in operation, the shaft 12 may move either axially or radially without disrupting the sealing effect because the floating brush seal 10 accommodates such movement. If the shaft 12 moves radially, the bristle portion 32 of the brush 30 accommodates the movement. If the shaft 12 moves axially in the direction of the back panel 18, the back plate 36 is forced toward the spiral groove seal 52 creating a stiffer film. The stiffer film forces the brush 30 back against the springs 76 and the sealing effect is not disrupted. If the shaft 12 moves axially in the direction of the front panel 14, the brush 30 is forced against the springs 76 which act to hold the brush 30 adjacent to the spiral groove seal 52 as to not disrupt the sealing effect.

Figure 4:
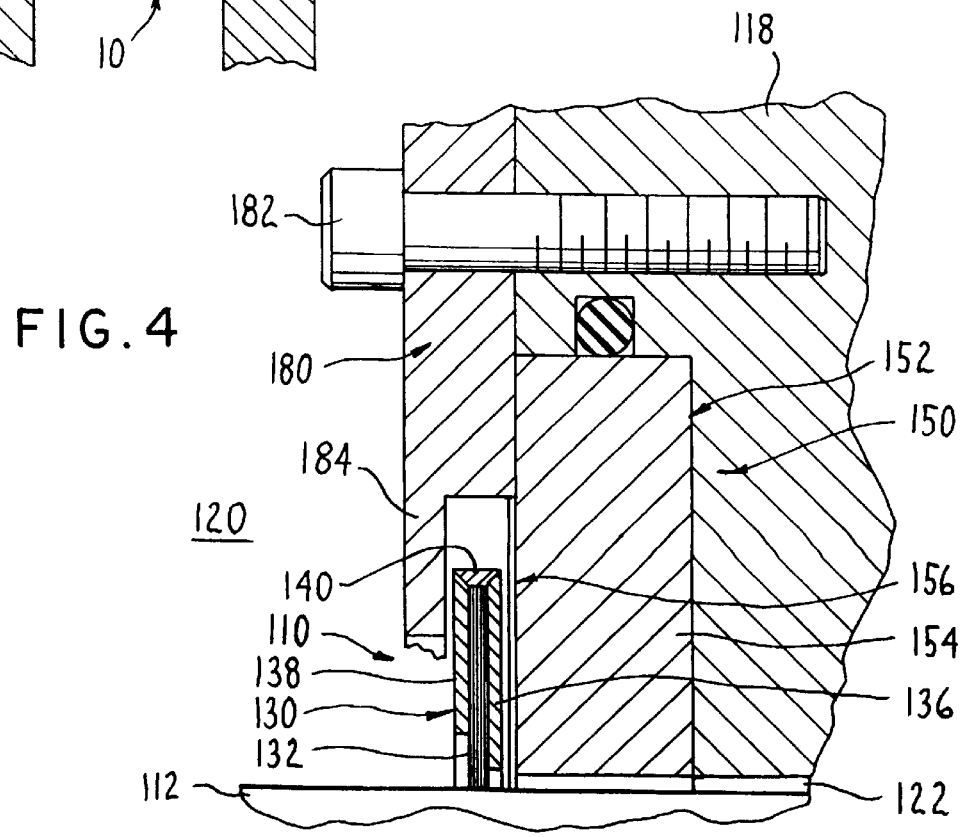
FIG. 4 is a sectional view of a hybrid floating brush seal according to the first alternative embodiment of the present invention.

The first alternative embodiment of the hybrid floating brush seal according to the concepts of the present invention is depicted in FIG. 4, and is designated generally by the numeral 110. The seal 110 encircles a shaft 112 that is rotatably supported by a front panel (not shown) and passes through a back panel 118. An area of high pressure, indicated by the numeral 120, exists in front of the seal 110 while an area of low pressure, indicated by the numeral 122, exists behind the seal 110. Thus, the seal 110 functions to substantially prevent fluid passage from the area of high pressure 120 to the area of low pressure 122. As will be subsequently described, the seal 110 accomplishes this by forming a primary seal and a secondary seal between the high pressure area 120 and the low pressure area 122.

The first alternative embodiment of the hybrid floating brush seal 110 includes a brush 130 that frictionally engages the shaft 112. As may be seen in FIG. 4, the brush 130 includes a bristle portion 132 that is sandwiched between a front plate 138 and a back plate 136 and connected by a weld 140.

An axial load-supporting device 150 is positioned adjacent to the back plate 136. The axial load-supporting device 150 includes a spiral groove seal 152 having a body 154 that is nonrotatably carried by the back panel 118. The spiral groove seal 152 is disposed such that the groove section 156 is adjacent to the back plate 136. Both elements 136 and 156 have machined smooth surfaces that allow the two elements 136 and 156 to rotate against each other with minimal friction for a microsecond and then without friction at close distances thereafter.

A shroud ring 180 is connected to the back panel 118 by a plurality of suitable connectors such as the mounting bolts 182 depicted in FIG. 4. The shroud ring 180 includes a lip 184 that extends inwardly from the shroud ring 180 in the direction of the shaft 112. When the seal 110 is assembled, the lip 184 traps the brush 130 between the spiral groove seal 152 and the shroud ring 180.

The first alternative embodiment of the hybrid floating brush seal 110 operates in the following manner. The brush 130 substantially rotates with the shaft 112 solely because of the frictional forces between the bristle portion 132 and the shaft 112. The interface between the bristle portion 132 and the shaft 112 forms a primary seal between the high pressure area 120 and the low pressure area 122. The effectiveness of the primary seal may be adjusted by altering the materials and configuration of the bristle portion 132. The problems of high friction between the brush 130 and the shaft 112 are eliminated because the brush 130 substantially rotates with the shaft 112 in the present invention. Although the brush 130 may slip on the shaft 112, the relative velocity between the shaft 112 and the brush 130 remains relatively low, and no (or very little) damage and/or wear occurs to the bristles.

As the back plate 136 rotates adjacent to the groove section 156 of the spiral groove seal 152, a film of air is created between the spiral groove seal 152 and the back plate 136. The film of air forces the brush 130 away from the spiral groove seal 152 in the direction of the lip 184. As the brush 130 moves, a small amount of leakage occurs between the high pressure area 120 and the low pressure area 122 through the gap between the back plate 136 and the groove section 156. The amount of leakage, however, is insignificant compared to the overall sealing effect of the seal 110. The amount of leakage is limited also by the presence of the lip 184 which acts to increase the pressure on the front plate 138 as the brush 130 approaches the lip 184. Thus, in operation, the brush 130 automatically adjusts its position between the lip 184 and the spiral groove seal 152 and forms a low leakage secondary seal.

While in operation, the shaft 112 may move either axially or radially without disrupting the sealing effect. If the shaft 112 moves radially, the bristle portion 132 of the brush 130 accommodates the movement. If the shaft 112 moves axially in the direction of the back panel 118, the back plate 136 is forced toward the spiral groove seal 152 creating a stiffer film. The stiffer film forces the brush 130 back toward the lip 184 and the sealing effect is not disrupted. If the shaft 112 moves axially in the direction of the lip 184, the pressure increases on the front plate 138 and the brush 130 is maintained adjacent to the spiral groove seal 152 as to not disrupt the sealing effect. Thus, the plate 184 has a limiting effect on the movement of the brush 130.

The second alternative embodiment of the hybrid floating brush seal according to the concepts of the present invention is depicted in FIG. 5, and is designated generally by the numeral 210. The seal 210 encircles a shaft 212 that is rotatably supported by a front panel (not shown) and passes through a back panel 218. An area of high pressure, indicated by the numeral 220, exists in front of the seal 210 while an area of low pressure, indicated by the numeral 222, exists behind the seal 210. Thus, the seal 210 functions to substantially prevent fluid passage from the area of high pressure 220 to the area of low pressure 222. As will be subsequently described, the seal 210 accomplishes this by forming a primary seal and a secondary seal between the high pressure area 220 and the low pressure area 222.

The second alternative embodiment of the hybrid floating brush seal 210 includes a brush 230 that frictionally engages the shaft 212. As may be seen in FIG. 5, the brush 230 includes a bristle portion 232 that is carried by a holder 234. The holder 234 includes a back plate 236 and a front plate 238 connected by an end plate 240.

An axial load-supporting device 250 is positioned adjacent to the back plate 236 of the holder 234. The axial load-supporting device 250 includes a hydrostatic thrust seal 262 that is nonrotatably carried by the back panel 218. The hydrostatic thrust seal 262 includes a plurality of passages 286 that direct compressed air from a source of compressed air (not shown) toward the back plate 236. The face 288 of the hydrostatic thrust seal 262 has a machined smooth surface that allows the back plate 236 to rotate without friction at close distances, and still maintain a seal between the area of high pressure 220 and the area of low pressure 222.

A shroud ring 280 is connected to the back panel 218 by a plurality of suitable connectors such as the mounting screws 282 depicted in FIG. 5. The shroud ring 280 includes a lip 284 that extends inwardly from the shroud ring 280 in the direction of the shaft 212. When the seal 210 is assembled, the lip 284 traps the brush 230 between the hydrostatic thrust seal 262 and the shroud ring 280.

The second alternative embodiment of the hybrid floating brush seal 210 operates in the following manner. The brush 230 rotates with the shaft 212 solely because of the frictional forces between the bristle portion 232 and the shaft 212. The interface between the bristle portion 232 and the shaft 212 forms a primary seal between the high pressure area 220 and the low pressure area 222. The effectiveness of the primary seal may be adjusted by altering the materials and configuration of the bristle portion 232. The problems of high friction between the brush 230 and the shaft 212 are eliminated because the brush 230 rotates with the shaft 212 in the present invention.

The hydrostatic thrust seal 262 creates a film of air between the face 288 and the back plate 236 by directing compressed air between the two. The film of air forces the brush 230 away from the face 288 in the direction of the lip 284. As the brush 230 moves away from face 288, a small amount of leakage occurs between the high pressure area 220 and the low pressure area 222 through the gap between the back plate 236 and the face 288. The secondary seal is thus established. The amount of leakage, however, is insignificant compared to the overall sealing effect of the seal 210. The amount of leakage is limited by the presence of the lip 284 which acts to increase the pressure on the front plate 238 as the brush 230 approaches the lip 284. Thus, in operation, the brush 230 automatically adjusts its position between the lip 284 and the face 288 and forms a secondary seal.

While in operation, the shaft 212 may move either axially or radially without disrupting the sealing effect. If the shaft 212 moves radially, the bristle portion 232 of the brush 230 accommodates the movement. If the shaft 212 moves axially in the direction of the back panel 218, the back plate 236 is forced toward the face 288 creating a stiffer film. The stiffer film forces the brush 230 back toward the lip 284 and the sealing effect is not disrupted. If the shaft 212 moves axially in the direction of the lip 284, the pressure increases on the front plate 238 and the brush 230 is maintained adjacent to the face 288 as to not disrupt the sealing effect.

Figure 6:
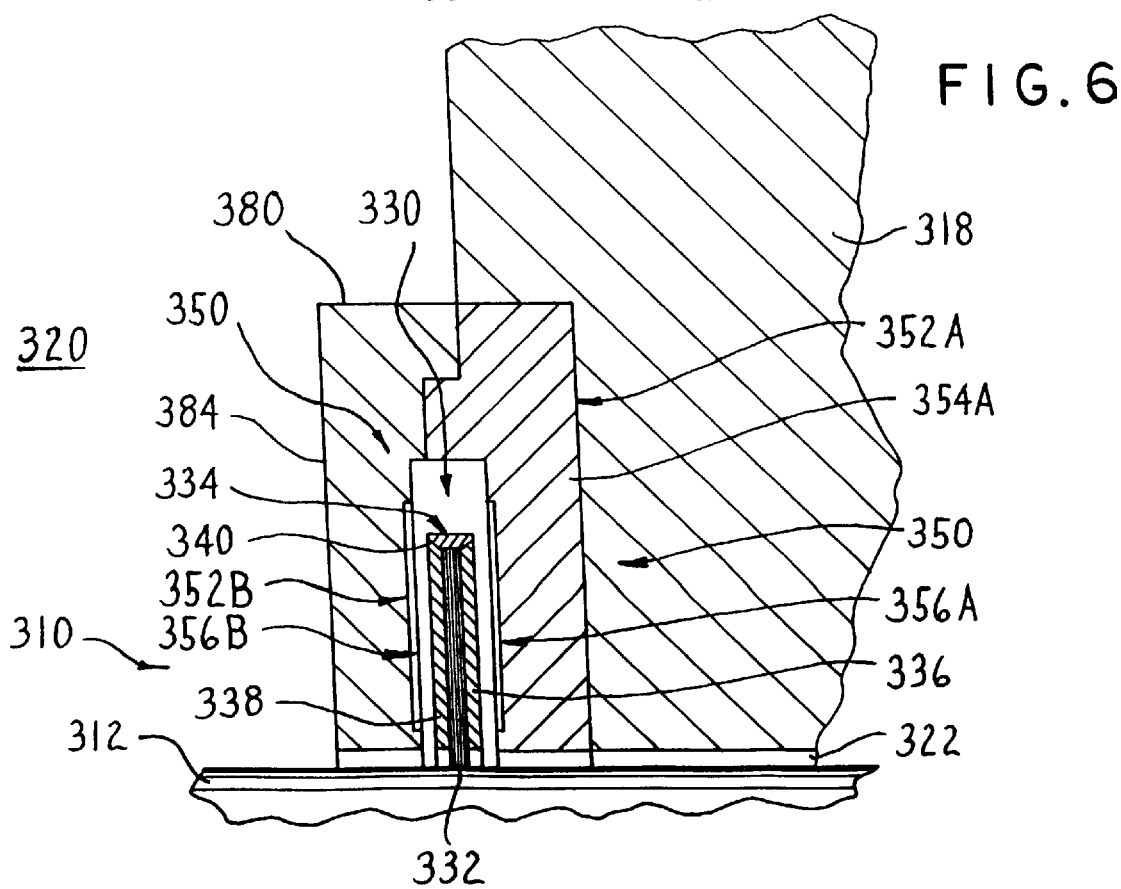
FIG. 6 is a sectional view of a hybrid floating brush seal according to the third alternative embodiment of the present invention.

The third alternative embodiment of the hybrid floating brush seal according to the concepts of the present invention is depicted in FIG. 6, and is designated generally by the numeral 310. The seal 310 encircles a shaft 312 that is rotatably supported by a front panel (not shown) and passes through a back panel 318. An area of high pressure, indicated by the numeral 320, exists in front of the seal 310 while an area of low pressure, indicated by the numeral 322, exists behind the seal 310. Thus, the seal 310 functions to substantially prevent fluid passage from the area of high pressure 320 to the area of low pressure 322. As will be subsequently described, the seal 310 accomplishes this by forming a primary seal and a secondary seal between the high pressure area 320 and the low pressure area 322.

The third alternative embodiment of the hybrid floating brush seal 310 includes a brush 330 that frictionally engages the shaft 312. As may be seen in FIG. 6, the brush 330 includes a bristle portion 332 that is carried by a holder 334. The brush includes a back plate 336 and a front plate 338 connected by a weld 340. In the holder 334 used in the third alternative embodiment of the present invention, the front plate 338 is approximately the same height as the back plate 336.

An axial load-supporting device 350 is positioned adjacent to both the back plate 336 and the front plate 338. Each axial load-supporting device 350 includes a spiral groove seal 352 having a body 354 and a groove section 356. Spiral groove seal 352A is carried by the back panel 318 while spiral groove seal 352B is carried by a shroud ring 380. Spiral groove seal 352A is disposed such that the groove section 356A is adjacent to the back plate 336. Spiral groove seal 352B is disposed such that the groove section 356B is adjacent to the front plate 338. Each spiral groove seal 352 and the faces of the front plate 338 and the back plate 336 have machined smooth surfaces that allow rotation without friction at close distances.

The shroud ring 380 is connected to the back panel 318 by a suitable connector such as the interlocking arrangement depicted in FIG. 6. The shroud ring 380 includes a lip 384 that extends inwardly from the shroud ring 380 in the direction of the shaft 312. The lip 384 supports the spiral groove seal 352B that is adjacent to the front plate 338. When the seal 310 is assembled, the lip 384 traps the brush 330 between both spiral groove seals 352A and 352B.

The third alternative embodiment of the hybrid floating brush seal 310 operates in the following manner. The brush 330 substantially rotates with the shaft 312 solely because of the frictional forces between the bristle portion 332 and the shaft 312. The interface between the bristle portion 332 and the shaft 312 forms a primary seal between the high pressure area 320 and the low pressure area 322. The effectiveness of the primary seal may be adjusted by altering the materials and configuration of the bristle portion 332. The problems of high friction between the brush 330 and the shaft 312 are thus eliminated because the brush 330 substantially rotates with the shaft 312 in the present invention. Although some slipping may occur between the bristle portion 332 and the shaft 312, the relative velocity between the two remains relatively low.

As brush 330 rotates adjacent to the groove sections 356A and 356B of the spiral groove seals 352A and 352B, a film of air is created between the groove section 356A of seal 352A and the back plate 336 and between the groove section 356B of seal 352B and the front plate 338. Thus, in operation, the films of air on either side of the holder 334 automatically adjust the position of the brush 330 and function as a secondary seal.

While in operation, the shaft 312 may move either axially or radially without disrupting the sealing effect. If the shaft 312 moves radially, the bristle portion 332 of the brush 330 accommodates the movement. If the shaft 312 moves axially in the direction of the back panel 318, the back plate 336 is forced toward the groove section 356A creating a stiffer film. The stiffer film forces the brush 330 toward the lip 384. If the shaft 312 moves axially in the direction of the lip 384, the groove section 356B on the lip 384 creates a stiffer film in front of the front plate 338 forcing the brush 330 back towards the back plate 318. In either case, the sealing effect is not disrupted.

Figure 7:
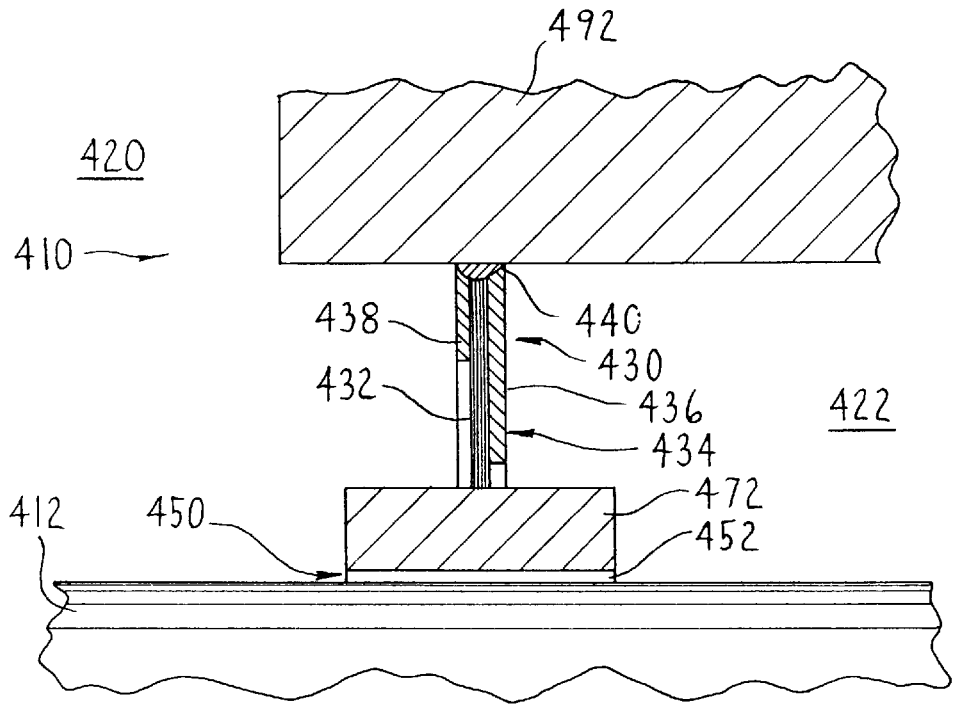
FIG. 7 is a sectional view of a hybrid floating brush seal according to the fourth alternative embodiment of the present invention.

The fourth alternative embodiment of the hybrid floating brush seal according to the concepts of the present invention is depicted in FIG. 7, and is designated generally by the numeral 410. The seal 410 encircles a shaft 412 that is rotatably supported by a nonrotating body (not shown). An area of high pressure, indicated by the numeral 420, exists in front of the seal 410 while an area of low pressure, indicated by the numeral 422, exists behind the seal 410. Thus, the seal 410 functions to substantially prevent fluid passage from the area of high pressure 420 to the area of low pressure 422. As will be subsequently described, the seal 410 accomplishes this by forming a primary seal and a secondary seal between the high pressure area 420 and the low pressure area 422.

The fourth alternative embodiment of the hybrid floating brush seal 410 includes a brush 430 that frictionally engages a collar 472. As may be seen in FIG. 7, the brush 430 includes a bristle portion 432 that is carried by a holder 434. The holder 434 includes a back plate 436 and a front plate 438 connected by a weld 440. The brush 430 is nonrotatably connected to a nonrotatable member 492 that surrounds the shaft 412.

An axial load-supporting device 450 is positioned on the inner surface of the collar 472 adjacent to the shaft 412. The axial load-supporting device 450 includes a self acting film device 452 that forms a film of air between the collar 472 and the shaft 412 in response to relative rotation therebetween. Structural elements (not shown) prevent the collar 472 from moving out of engagement with the brush 430.

The fourth alternative embodiment of the hybrid floating brush seal 410 operates in the following manner. The brush 430 remains stationary as the shaft 412 rotates thus forming the secondary seal. As the shaft 412 rotates, the self acting film device 452 creates a cushion of air between the shaft 412 and the collar 472. The gap between the collar 472 and the shaft 412 functions as the primary seal. The collar 472 is substantially held against rotation by the frictional force of the brush 430. If the collar 472 rotates against the brush 430, the speed of rotation will be significantly less than that of the shaft 412. Furthermore, if the brush 430 wears on the collar 472, the replacement cost of the collar 472 is minimal compared with that for the shaft 412.

While in operation, the shaft 412 may move either axially or radially without disrupting the seal effect. If the shaft 412 moves radially, the bristle portion 432 of the brush 430 accommodates the movement. As the shaft 412 moves radially, the air cushion created by the self acting film device 452 on the collar 472 acts to prevent the shaft 412 from contacting the collar 472. The shaft 412 may move axially in either direction because the shaft 412 is floating on the air cushion created by the self acting film device 452. In either case, the sealing effect between the high pressure area 420 and the low pressure area 422 is not disrupted.

Figure 8:
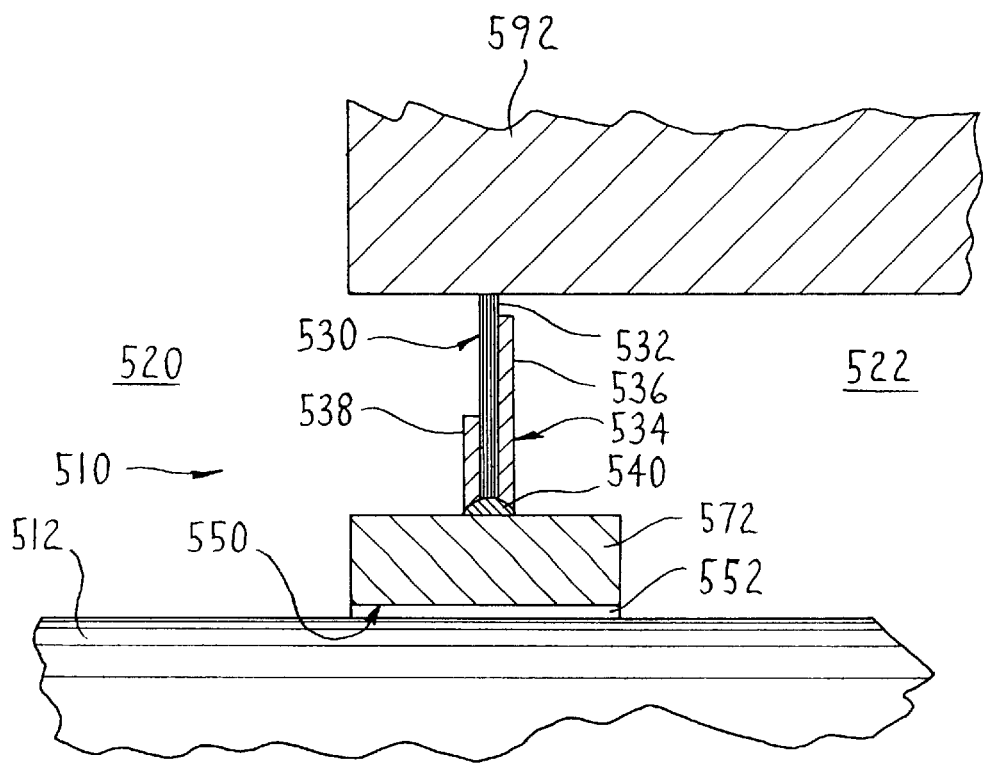
FIG. 8 is a sectional view of a hybrid floating brush seal according to the fifth alternative embodiment of the present invention.

The fifth alternative embodiment of the hybrid floating brush seal according to the concepts of the present invention is depicted in FIG. 8, and is designated generally by the numeral 510. The seal 510 encircles a shaft 512 that is rotatably supported by a nonrotating body (not shown). An area of high pressure, indicated by the numeral 520, exists in front of the seal 510 while an area of low pressure, indicated by the numeral 522, exists behind the seal 510. Thus, the seal 510 functions to substantially prevent fluid passage from the area of high pressure 520 to the area of low pressure 522. As will be subsequently described, the seal 510 accomplishes this by forming a primary seal and a secondary seal between the high pressure area 520 and the low pressure area 522.

The fifth alternative embodiment of the hybrid floating brush seal 510 includes a brush 530 that frictionally engages a nonrotatable member 592 forming a secondary seal. As may be seen in FIG. 8, the brush 530 includes a bristle portion 532 that is carried by a holder 534. The holder 534 includes a back plate 536 and a front plate 538 connected by weld 540. The brush 530 is nonrotatably connected to a collar 572 that surrounds the shaft 512.

An axial load-supporting device 550 is positioned on the inner surface of the collar 572 adjacent to the shaft 512. The axal load-supporting device 550 includes a self acting film device 552 that forms a film of air between the collar 572 and the shaft 512 in response to relative rotation therebetween. Structural elements (not shown) prevent the collar 572 from moving out of position.

The fifth alternative embodiment of the hybrid floating brush seal 510 operates in the following manner. As the shaft 512 rotates, the self acting film device 552 creates a cushion of air between the shaft 512 and the collar 572. The gap between the collar 572 and the shaft 512 functions as the primary seal. The collar 572 is substantially held against rotation by the frictional force of the brush 530 against a nonrotating member 592. If the force created by the cushion of air is large enough to overcome the frictional forces between the bristle portion 532 and the nonrotatable member 592, the collar 572 will rotate at a speed significantly less than the speed of the shaft 512. Thus, the problems of excessive wear and heat generation caused by the high speed rotation are avoided.

While in operation, the shaft 512 may move either axially or radially without disrupting the sealing effect. If the shaft 512 moves radially, the bristle portion 532 of the brush 530 accommodates the movement. As the shaft 512 moves radially, the air cushion created by the self acting film device 552 on the collar 572 acts to prevent the shaft 512 from contacting the collar 572. The shaft 512 may move axially in either direction because the shaft 512 is floating on the air cushion created by the self acting film device 552. In either case, the sealing effect between the high pressure area 520 and the low pressure area 522 is not disrupted.

Figure 9:
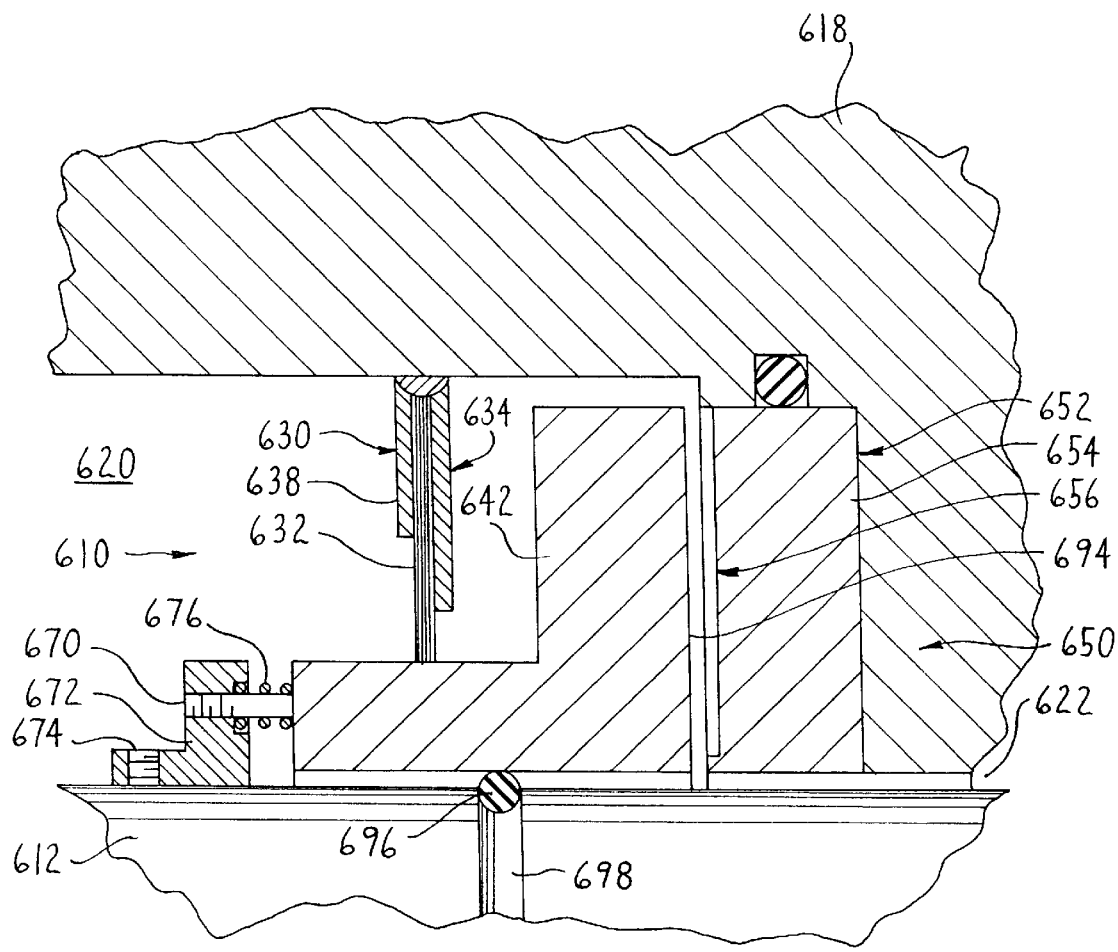
FIG. 9 is a sectional view of a hybrid floating brush seal according to the sixth alternative embodiment of the present invention.

The sixth embodiment of a hybrid floating brush seal of the present invention is depicted in FIG. 9 and is indicated generally by the numeral 610. The seal 610 encircles a shaft 612 that is rotatably supported by a nonrotating front panel (not shown) and passes through a nonrotating back panel 618. An area of high pressure, indicated by the numeral 620, exists in front of the seal 610 while an area of low pressure, indicated by the numeral 622, exists behind the seal 610. Thus, the seal 610 functions to substantially prevent fluid passage from the area of high pressure 620 to the area of low pressure 622. As will be subsequently described, the seal 610 accomplishes this by forming a primary seal and a secondary seal between the high pressure area 620 and the low pressure area 622.

The sixth embodiment of the hybrid floating brush seal 10 includes a brush 630 having a bristle portion 632 that is carried by a holder 634. The holder 634 is nonrotatably connected to the back plate 618 while the bristle portion 632 frictionally engages a collar 642. A second collar 672 is nonrotatably attached to the shaft 612 by a set screw 674. A plurality of pins 670 extend from the collar 672 and support a spring 676. The spring 676 engages the collar 642 and biases it away from the second collar 672.

The collar 642 is connected to the shaft 612 by an O-ring 696 that resides in a groove 698 in the shaft 612. The O-ring 696 causes the collar 672 to substantially rotate with the shaft 612 and forms the primary seal between the high pressure area 620 and the low pressure area 622.

With continued reference to FIG. 9, an axial load-supporting device 650 is disposed adjacent the collar 642 and includes a spiral groove seal 652 having a body 654 that is nonrotatably carried by the back panel 618. The spiral groove seal 652 is disposed such that the groove section 656 is adjacent to the rear surface 694 of the collar 642. Both elements 694 and 656 have machined smooth surfaces that allow the two elements 694 and 656 to rotate without friction at close distances.

The sixth alternative embodiment of the hybrid floating brush seal 610 operates in the following manner. The collar 642 is forced into contact with the spiral groove seal 652 by the springs 676. Thus, at start up, when the shaft 612 is slowly rotating, a seal is maintained between the spiral groove seal body 652 and the collar 672 by the force of the springs 676. The use of the springs 676 provides an added degree of sealing at low shaft speeds but may increase the amount of friction in the seal 610.

The interface between the bristle portion 632 and the collar 642 forms a first part of the secondary seal between the high pressure area 620 and the low pressure area 622. The problems of high friction between the brush 630 and the shaft 612 are eliminated because the brush 630 now contacts the collar 642 which is significantly less expensive to replace than the shaft 612.

As the shaft 612 increases speed, a film of air is created between the spiral groove seal 652 and the rear surface 694 of the collar 642. The film of air forces the collar 642 away from the spiral groove seal 652 in the direction of the brush 630. A second part of the secondary seal is formed between the collar 642 and the spiral groove seal 652. As the collar 642 moves toward the second collar 672, the springs 676 force the collar 642 back toward the spiral groove seal 652. Thus, in operation, the collar 642 automatically adjusts its position between the springs 676 and the spiral groove seal 652.

While in operation, the shaft 612 may move either axially or radially without disrupting the sealing effect. If the shaft 612 moves radially, the bristle portion 632 of the brush 630 accommodates the movement. If the shaft 612 moves axially in the direction of the back panel 618, the collar 642 is forced toward the spiral groove seal 652 creating a stiffer film. The stiffer film forces the collar 642 back against the springs 676 and the sealing effect is not disrupted. If the shaft 612 moves axially in the direction away from the back panel 618, the collar 642 is forced against the springs 676 which act to hold the collar 642 adjacent to the spiral groove seal 652 as to not disrupt the sealing effect.

While a full and complete description of the invention has been set forth in accordance with the dictates of the patent statutes, it should be understood that modification can be resorted to without departing from the spirit hereof or the scope of the appended claims.

What is claimed is:

1. A seal assembly cooperating between a housing and a shaft rotatable relative thereto for creating a sealing relationship between areas of high and low pressures, said assembly comprising:

a face seal member nonrotatably associated with the housing and defining thereon a first annular sealing face which surrounds the shaft and extends generally transversely with respect to a longitudinal axis of the shaft;

an annular brush surrounding the shaft for rotation therewith and having at least one plurality of bristles disposed in an annular array surrounding the shaft;

said brush including an annular holder, said one plurality of bristles being mounted on said holder such that free ends of said bristles are in sealing contact with the shaft to form a first seal between the areas of high and low pressures, said one plurality of bristles being rotatable along with the shaft; and said holder including thereon a second annular sealing face which surrounds the shaft and extends generally transversely with respect to the shaft axis, said second sealing face being disposed in axially adjacent and opposed face-to-face relation with said first annular sealing face to form a non-contacting second seal between the areas of high and low pressures.

2. The seal assembly according to claim 1, wherein said face seal member and said brush are configured and disposed to accommodate both radial and axial movements of the shaft.

3. The seal assembly according to claim 1, wherein:

said brush is nonrotatably mounted on the shaft;

said first annular sealing face and said second annular sealing face are configured to form an air cushion therebetween during relative rotation of said first and second annular sealing faces.

4. The seal assembly according to claim 1, wherein:

said holder includes first and second plates connected to one another at one end thereof, said one plurality of bristles being disposed between said first and second plates;

said second annular sealing face being disposed on said first plate;

said assembly further including:

a collar nonrotatably mounted on the shaft and surrounding the shaft, said collar being disposed adjacent said second plate;

a plurality of pins extending from said collar and through at least a portion of said holder adjacent said connected ends of said first and second plates to nonrotatably mount said holder on the shaft;

said pins being axially slidingly engaged within said holder; and a plurality of springs, each said spring being disposed about one of said pins and biasing said holder toward said first annular sealing face.

5. The seal assembly according to claim 1, wherein said brush comprises additional pluralities of bristles mounted on said holder in an axially spaced-apart relationship with respect to one another, the free ends of said additional pluralities of bristles being in sealing contact with the shaft to form said first seal.

6. The seal assembly according to claim 1, wherein said face seal member includes a plurality of passages disposed therein to direct a flow of compressed air from a source through the passages for discharge against said second annular sealing face.

7. The seal assembly according to claim 1, wherein said brush is rotatable along with the shaft solely through frictional engagement of the free ends of said bristles with the shaft.

8. The seal assembly according to claim 7, wherein a ring member is nonrotatably mounted on the housing and includes a lip extending toward the shaft, said lip and said face seal member being disposed to confine said brush therebetween.

9. The seal assembly according to claim 7, wherein:

said holder includes first and second plates connected to one another at one end thereof, said one plurality of bristles being disposed between said plates;

said second annular sealing face being disposed on said first plate;

said assembly further includes a ring member nonrotatably mounted on the housing including a lip extending toward the shaft, said lip and said face seal member being disposed to confine said brush therebetween;

said ring member includes a third annular sealing face surrounding the shaft and extending generally transversely with respect to the shaft axis;

said holder including a fourth annular sealing face disposed on said second plate surrounding the shaft and extending generally transversely with respect to the shaft axis, said fourth annular sealing face being disposed in axially adjacent and opposed face-to-face relation with said third annular sealing face to form said second seal;

said first annular sealing face and said second annular sealing face being configured to form an air cushion therebetween during relative rotation of said first and second annular sealing faces, and said third annular sealing face and said fourth annular sealing face being configured to form an air cushion therebetween during relative rotation of said third and fourth annular sealing faces.

10. The seal assembly according to claim 1, wherein said face seal member includes a passage disposed therein to direct a flow of air from a source for discharge between said first and second annular sealing faces.

11. The seal assembly according to claim 8, wherein said holder includes first and second plates connected to one another at one end thereof, said one plurality of bristles being disposed between said plates, said second annular sealing face being disposed on said first plate and said lip being disposed to face said second plate.

12. The seal assembly according to claim 9, wherein a plurality of grooves are disposed in each of said first and third annular sealing faces in a circumferentially spaced-apart relationship with one another to enable the formation of said air cushions between said first and second annular sealing faces and said third and fourth annular sealing faces during relative rotation of said first and second annular sealing faces and said third and fourth annular sealing faces.

13. A seal assembly cooperating between a housing and a shaft rotatable relative thereto for creating a sealing relationship between areas of high and low pressures, said assembly comprising:

an annular brush surrounding the shaft and having at least one plurality of bristles disposed in an annular array surrounding the shaft;

said brush including an annular holder nonrotatably mounted on the shaft, said one plurality of bristles being mounted on said holder such that free ends of said bristles are in sealing contact with the shaft to form a first seal between the areas of high and low pressures, said one plurality of bristles being rotatable along with said holder and the shaft;

a first sealing member nonrotatably associated with the housing; and said holder having a second sealing member disposed to cooperate with said first sealing member to form a second seal between the areas of high and low pressures.

14. The seal assembly according to claim 13, further including:

a collar nonrotatably mounted on the shaft and disposed adjacent said holder;

a plurality of pins extending from said collar through at least a portion of said holder to nonrotatably mount said holder on the shaft;

said pins being slidingly engaged with said holder; and a plurality of springs, each said spring being disposed about one of said pins and biasing said holder toward said first sealing member.

15. The seal assembly according to claim 14, wherein:

said holder includes first and second plates connected to one another at one end thereof, said one plurality of bristles being disposed between said first and second plates;

said second sealing member being disposed on said first plate; and said collar being disposed adjacent said second plate.

16. The seal assembly according to claim 13, wherein said first sealing member and said brush are configured and disposed to accommodate both radial and axial movements of the shaft.

17. The seal assembly according to claim 13, wherein said first sealing member and said second sealing member are configured to form an air cushion therebetween during relative rotation of said first and second sealing members.

18. The seal assembly according to claim 17, wherein:

said first sealing member comprises a first annular sealing face extending transversely with respect to a longitudinal axis of the shaft;

said second sealing member comprises a second annular sealing face extending transversely with respect to the shaft axis; and said second sealing face being disposed in axially adjacent and opposite face-to-face relation with said first sealing face to form said second seal.

19. The seal assembly according to claim 13, wherein said brush comprises additional pluralities of bristles mounted on said holder in an axially spaced-apart relationship with respect to one another, the free ends of said additional pluralities of bristles being in sealing contact with the shaft to form said first seal.

20. The seal assembly according to claim 13, wherein said second seal comprises a non-contacting seal.

21. A seal assembly cooperating between a housing and a shaft rotatable relative thereto for creating a sealing relationship between areas of high and low pressures, said assembly comprising:

a face seal member nonrotatably associated with the housing and defining thereon a first annular sealing face which surrounds the shaft and extends generally transversely with respect to a longitudinal axis of the shaft;

an annular brush surrounding the shaft for rotation therewith and having a plurality of bristles disposed in an annular array surrounding the shaft;

said brush including an annular holder, said bristles being mounted on said holder such that free ends of said bristles are in sealing contact with the shaft to form a first seal between the areas of high and low pressures, said bristles being rotatable along with the shaft solely through engagement of the free ends of said bristles with the shaft;

said holder including thereon a second annular sealing face which surrounds the shaft and extends generally transversely with respect to the shaft axis, said second sealing face being disposed in axially adjacent and opposed face-to-face relation with said first annular sealing face; and said face seal member including a passage disposed therein in communication with an air source for directing a flow of air between said first and second annular sealing faces to form a non-contacting second seal between the areas of high and low pressures.

22. A seal assembly cooperating between a housing and a shaft rotatable relative thereto for creating a sealing relationship between areas of high and low pressures, said assembly comprising:

a first face seal member nonrotatably associated with the housing and defining thereon a first annular sealing face which surrounds the shaft and extends generally transversely with respect to a longitudinal axis of the shaft;

an annular brush surrounding the shaft for rotation therewith and having a plurality of bristles disposed in an annular array surrounding the shaft;

said brush including an annular holder, said bristles being mounted on said holder such that free ends of said bristles are in sealing contact with the shaft to form a first seal between the areas of high and low pressures, said bristles being rotatable along with the shaft solely through engagement of the free ends of said bristles with the shaft;

a second face seal member nonrotatably mounted on the housing and extending toward the shaft and defining thereon a second annular sealing face which surrounds the shaft and extends generally transversely with respect to a longitudinal axis of the shaft, said first and second face seal members being disposed axially spaced-apart from one another to confine said brush therebetween;

said holder including thereon third and fourth annular sealing faces which surround the shaft and face away from one another and extend generally transversely with respect to the shaft axis, said third and fourth annular sealing faces being disposed in axially adjacent and opposed face-to-face relation with the respective first and second annular sealing faces to form a non-contacting second seal between the areas of high and low pressures.

23. A seal assembly cooperating between an outer housing member and an inner shaft member rotatable relative to one another for creating a sealing relationship between areas of high and low pressures, said assembly comprising:

a face seal structure nonrotatably associated with one member and defining thereon a first annular sealing face which extends generally transversely with respect to a longitudinal axis of the shaft member;

an annular brush including an annular holder and a plurality of bristles mounted in an annular array on said holder such that free ends of said bristles are in sealing contact with the other member to form a first seal between the areas of high and low pressures, said one plurality of bristles being rotatable along with said other member; and said holder including thereon a second annular sealing face which extends generally transversely with respect to the axis, said second annular sealing face being disposed in axially adjacent and opposed face-to-face relation with said first annular sealing face to form a non-contacting second seal between the areas of high and low pressures.

24. The seal assembly of claim 23 wherein said face seal structure includes a passage therein to direct a flow of air from a source for discharge between said first and second annular sealing faces.

25. The seal assembly of claim 23 wherein said first and second annular sealing faces are configured to form an air cushion therebetween during relative rotation thereof.

26. The seal assembly of claim 23 wherein said brush is rotatable along with said other member solely through frictional engagement of the free ends of said bristles with said other member.

27. The seal assembly of claim 23 wherein said brush is supported solely by said other member through frictional engagement of the free ends of said bristles with said other member.

28. A seal assembly cooperating between a body and a rotatable shaft which rotates relative to the body for creating a sealing relationship between areas of high and low pressures, the shaft and the body together defining an annular region therebetween, said assembly comprising:

an annular brush disposed within the annular region and including a holder and a plurality of bristles mounted in an annular array on said holder such that free ends of said bristles define an annular area of contact with an annular extending peripheral surface of the shaft to form a first seal between the areas of high and low pressures, said brush being carried by said shaft for rotation therewith; and a face seal structure non-rotatably associated with said body and defining thereon a first annular sealing face which extends transversely with respect to a longitudinal axis of the shaft;

said holder defining thereon a second annular sealing face which extends transversely with respect to the axis, said second annular sealing face being disposed in axially adjacent and opposed face-to-face relation with said first annular sealing face to form a non-contacting second seal between the areas of high and low pressures.

* * * * *